United States Patent [19]

Bartle et al.

[11] Patent Number: 5,732,347
[45] Date of Patent: *Mar. 24, 1998

[54] IMMINENT CHANGE WARNING

[75] Inventors: Alden S. Bartle, Lawrenceville; George D. Erickson, Atlanta, both of Ga.

[73] Assignee: Oki Telecom, Inc., Suwanee, Ga.

[*] Notice: The term of this patent shall not extend beyond the expiration date of Pat. No. 5,722,068.

[21] Appl. No.: 466,067

[22] Filed: Jun. 6, 1995

Related U.S. Application Data

[63] Continuation of Ser. No. 186,777, Jan. 26, 1994.

[51] Int. Cl.$^6$ .................................. H04Q 7/00; H04Q 9/00
[52] U.S. Cl. ............................................. 455/421; 455/436
[58] Field of Search ................................. 379/58, 59, 60, 379/63; 455/33.1, 33.2, 54.1, 127, 421, 422, 436, 438, 524; 371/2.1, 5.1

[56] References Cited

U.S. PATENT DOCUMENTS

| | | | |
|---|---|---|---|
| 4,755,816 | 7/1988 | De Luca | 340/825.44 |
| 4,851,820 | 7/1989 | Fernandez | 455/67.1 |
| 4,939,766 | 7/1990 | Umemoto et al. | 379/58 |
| 4,996,715 | 2/1991 | Marui et al. | 455/33.2 |
| 5,032,835 | 7/1991 | De Luca | 340/825.44 |
| 5,117,449 | 5/1992 | Metroka et al. | 379/58 |
| 5,193,216 | 3/1993 | Davis | 455/67.7 |
| 5,230,087 | 7/1993 | Meyer et al. | 455/67.1 |
| 5,255,307 | 10/1993 | Mizikovsky | 379/58 |
| 5,267,261 | 11/1993 | Blakeney, III | 379/60 |
| 5,276,906 | 1/1994 | Felix | 455/33.2 |
| 5,329,555 | 9/1992 | Marko et al. | 375/100 |
| 5,345,467 | 9/1994 | Lomp et al. | 375/205 |
| 5,438,683 | 8/1995 | Durtler et al. | 455/74 |
| 5,450,613 | 9/1995 | Takahara et al. | 455/54.1 |
| 5,469,471 | 11/1995 | Wheatley, III | 375/205 |
| 5,471,671 | 11/1995 | Wang et al. | 455/63 |
| 5,493,693 | 2/1996 | Tanaka et al. | 455/33.1 |
| 5,564,077 | 10/1996 | Obayashi et al. | 455/54.2 |

FOREIGN PATENT DOCUMENTS 0431956   6/1991   European Pat. Off. ......... H04Q 7/04

*Primary Examiner*—Edward L. Coles, Sr.
*Assistant Examiner*—Kimberly A. Williams
*Attorney, Agent, or Firm*—Jeffrey R. Kuester; Thomas, Kayden, Horstemeyer & Risley

[57] ABSTRACT

A cellular telephone, in its most preferred embodiment, performs a method for notifying a digital cellular telephone user of an imminent communication disconnection. The preferred method includes, at least, generating at least one condition indication representative of at least one communication condition, analyzing the condition indication, determining whether a communication disconnection is imminent, enhancing quality of received communication signals when possible, and notifying the user of an imminent communication disconnection. Exemplary condition indications include, at least, continuous count and rate indications of frame checksum errors, insufficient quality frames, symbol errors, and chip errors, output power level indication, received signal strength indication, soft handoff status indication, other pilot signal indication, and current pilot signal strength indication. One exemplary analysis technique of determining when a communication disconnection is imminent includes evaluating whether any of a set of condition indications violates a predefined threshold indication, while other exemplary analysis techniques include evaluating whether fixed or historically adaptive combinations of condition indications violate run predefined thresholds, and evaluating combinations of condition indications weighted according to the degree of threshold violation. The process further uses a memory flag in a delayed redundant comparison before enabling a warning, examples of which include visual, sensory, and audible notification methods, including adding generated noise to the received audio signal. Alternate methods of the invention include notifying a user of an imminent inter-system handoff or an imminent change in communication mode.

38 Claims, 3 Drawing Sheets

IMMINENT CHANGE WARNING

CROSS-REFERENCE TO RELATED APPLICATION

This application is a continuation of application Ser. No. 08/186,777, filed on Jan. 26, 1994.

BACKGROUND OF THE INVENTION

The present invention relates generally to the field of telecommunications, and more specifically, to the field of cellular telephone user notification.

While the most common type of cellular telephone currently in use today is the analog cellular telephone, the use also known as utilizing the frequency division multiple access (FDMA) method, of digital cellular telephones is steadily increasing as development continues. It is generally understood that the term "digital cellular telephone" includes, at least, those cellular telephones which are capable of communicating through the code division multiple access (CDMA) method or the time division multiple access (TDMA) method, either exclusively, in combination, or in combination with an analog ability, in which case the telephones are also referred to as "dual mode" cellular telephones. Conventional cellular telephone communication systems, including both digital and analog systems, typically provide service by dividing an area into many smaller geographic areas, known as cells, each of which is serviced by a transmitter-receiver station, known as a cell site or base station. The cell sites are connected through land lines, or other communication links, to so-called mobile telephone switching offices (MTSO's) which are, in turn, connected to the public switched telephone network (PSTN).

As an analog cellular telephone begins to reach the boundary of a cell, it is common for the telephone to have difficulties in receiving a clear signal so that the user hears an increasing amount of ordinary static or noise from the analog receiver discriminator as the signal grows weaker. While the noise may be potentially annoying to a user, the noise nevertheless provides the user an opportunity to prepare for a potential disconnection by concluding the conversation or making provision for re-establishing the connection. While digital cellular telephones provide many advantages over analog cellular telephones, one known disadvantage is the abruptness of communication disconnections due to lack of noise or other warning. As a result, a user normally has no opportunity to prepare for a potential disconnection, and conversations can often be interrupted by sudden, unsuspected disconnections.

Also gaining popularity are various types of personal communication systems (PCS) and wireless private branch exchanges (PBX) which provide various other types of radio links into the PSTN. A privately owned PCS cell or wireless PBX typically provides service to specially equipped cellular telephones at little or no usage time cost while the telephones operate within its range, or microcell. However, when the cellular telephone travels outside the microcell, higher usage time rates are encountered since a public cellular provider begins supplying service to the telephone. Users are often unaware that such an inter-system handoff, as well as other types of changes in communication mode, are imminent, thus it would be desirable to provide a telephone which notifies users of imminent inter-system handoffs and other types of communication mode changes before the mode changes have occurred or preliminary system communication between cell sites begins.

There is, therefore, a need in the industry for a method and an apparatus which address these and other related, and unrelated, problems.

SUMMARY OF THE INVENTION

Briefly described, the present invention includes, in its most preferred embodiment, a method and an apparatus for notifying a digital cellular telephone user of an imminent communication disconnection. The preferred method includes, at least, generating at least one condition indication representative of at least one communication condition, analyzing the condition indication, determining whether a communication disconnection is imminent, enhancing quality of received communication signals when possible, and notifying the user of an imminent communication disconnection.

Exemplary condition indications include, at least, both continuous count and rate indications of frame checksum errors, insufficient quality frame errors, insufficient quality symbol errors, and insufficient quality chip errors, an output power level indication, a received signal strength indication, a soft handoff status indication, an other pilot signal indication, and a current pilot signal strength indication. One preferred exemplary analysis technique of determining when a communication disconnection is imminent includes evaluating whether any of a set of condition indications violates a predefined threshold indication. Other exemplary analysis techniques include evaluating whether fixed or historically adaptive combinations of condition indications violate predefined thresholds, and evaluating combinations of condition indications weighted according to the degree of threshold violation. The process of the preferred embodiment of the present invention further uses a memory flag in a delayed redundant comparison before enabling a warning, examples of which include visual, sensory, and audible notification methods, including adding generated noise to the received audio signal to emulate analog reception noise.

The present invention further includes alternate embodiments which monitor similar communication conditions to accomplish alternate results. In one alternate embodiment of the present invention, communication conditions are monitored to notify a user of an imminent inter-system handoff so that the user is provided an opportunity to alter any movement to remain well within a cell or microcell. In one such embodiment, such a warning is provided to the user before a base station recognizes a need to communicate handoff signaling to the cellular telephone or to another base station in order to give the user adequate time to react to the warning and to avoid unnecessarily using base station handoff initiation resources.

In addition to inter-system handoff, alternate embodiments are also included Which provide warnings for other types of changes in communication modes besides imminent disconnection and inter-system handoffs. By warning of an imminent change in a communication mode, the user is provided an opportunity to make accommodations to remain within a range of a given communication mode. In certain such embodiments, a warning is provided to the user, before a base station or mobile station recognizes a need to communicate signaling messages, to give the user adequate time to react to the warning and to avoid unnecessarily using base station resources. The user may desire this warning and find it helpful for the following reasons, either exclusively or in any combination, not limited, allow usage of specific service options not available in other communication modes, minimize the cost of the phone call where rates are based upon communication mode, maximize quality of the phone call where quality is based upon communication mode, maximize battery life where battery life is based upon communication mode, and to provide diagnostic information to a technical user. According to another alternate embodiment of the present invention, communication conditions are monitored in a dual mode cellular telephone to notify a base station of the need to change communication modes (digital v. analog) and to notify the user of an imminent communication mode change.

It is therefore an object of the present invention to provide a method and an apparatus for notifying a digital cellular telephone user of an imminent communication disconnection.

Another object of the present invention is to provide a method and an apparatus for monitoring a plurality of communication conditions to determine whether a disconnection is imminent.

Yet another object of the present invention is to provide a method and an apparatus for monitoring at least one communication condition in order to adaptively improve received signal quality and notify a user of an imminent communication disconnection.

Still another object of the present invention is to provide a method and an apparatus for evaluating whether fixed or historically adaptive combinations of condition indications violate predefined thresholds.

Still another object of the present invention is to provide a method and an apparatus for employing a memory flag in a delayed redundant comparison before enabling a user warning.

Still another object of the present invention is to provide a method and an apparatus for notifying a user of an imminent communication disconnection through generating and combining artificial noise with the received audio signal.

Still another object of the present invention is to provide a method and an apparatus for measuring pilot channel signal strength at a digital cellular telephone and notifying a user of an imminent communication disconnection if the telephone is not experiencing a soft handoff or detecting other pilot signals.

Still another object of the present invention is to provide a method and an apparatus for measuring transmitter output power from a digital cellular telephone and notifying a user of an imminent communication disconnection if the transmitter output power exceeds a predefined upper threshold level or falls below a predefined lower threshold level.

Still another object of the present invention is to provide a method and an apparatus for monitoring a plurality of communication conditions to detect and notify a user of an imminent change in communication.

Still another object of the present invention is to provide a method and an apparatus for monitoring at least one communication condition to detect and notify a user of an imminent change in communication mode.

Still another object of the present invention is to provide a method and an apparatus for monitoring at least one communication condition to detect and notify a user of an imminent inter-system handoff.

Still another object of the present invention is to provide a method and an apparatus for monitoring at least one communication condition to detect and notify a user of an imminent communication mode change in a dual mode cellular telephone.

Other objects, features and advantages of the present invention will become apparent upon reading and understanding the present specification, when taken in conjunction with the accompanying drawings.

DETAILED DESCRIPTION OF THE PREFERRED EMBODIMENT

Figure 1:
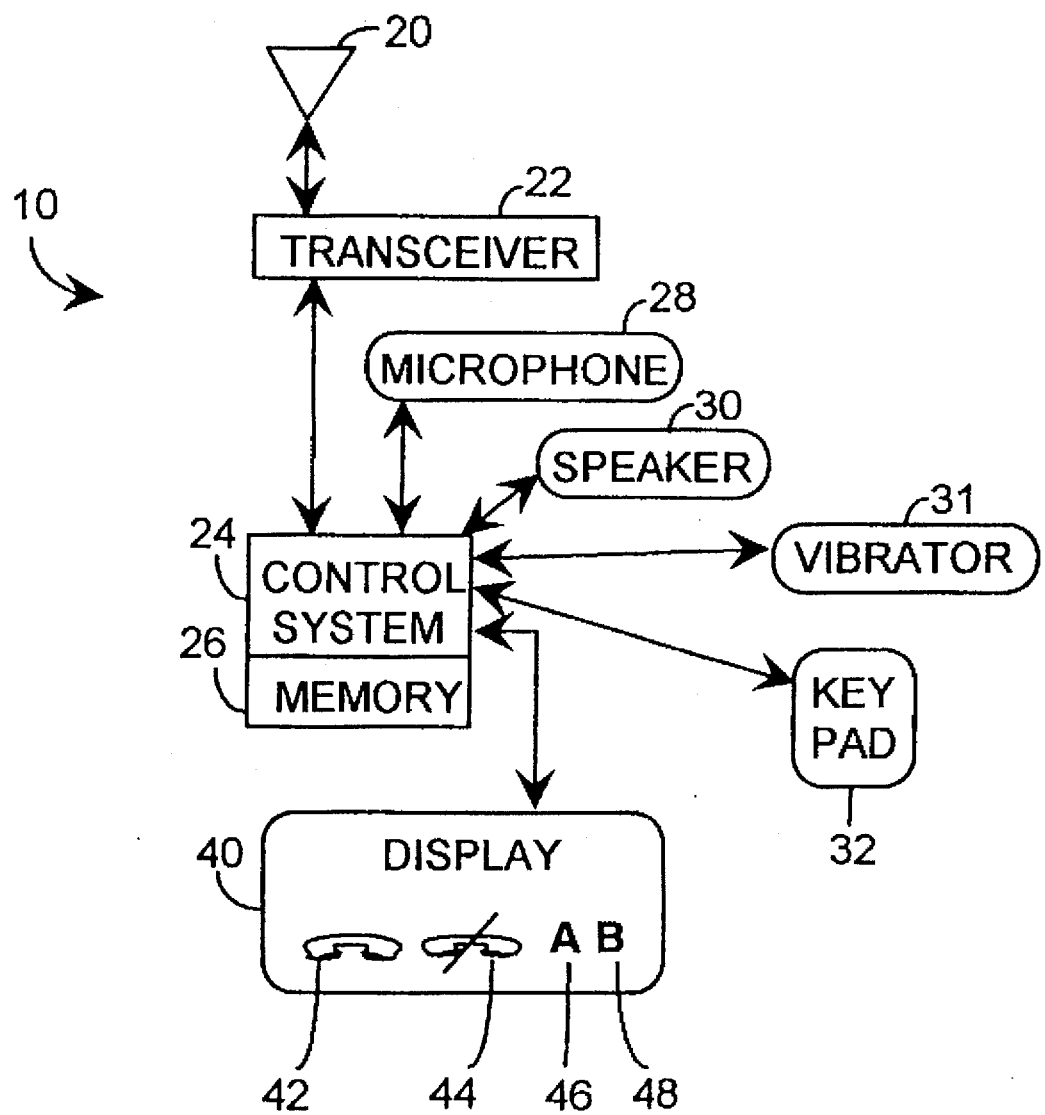
FIG. 1 is a block diagram representation of a cellular telephone in accordance with the preferred embodiment of the present invention.

Referring now in greater detail to the drawings in which like numerals represent like components throughout the several views, FIG. 1 shows a block diagram representation of a digital cellular telephone 10 which is first described below in terms of code division multiple access (CDMA) telephone. An antenna 20 is shown connected through a transceiver 22 to a microprocessor-based logic control system 24 having access to memory 26. Memory 26 is configured to contain programming information for directing operation of the digital cellular telephone 10. A conventional microphone 28, speaker 30, vibrator 31, and key pad 32 are also shown connected to the control system 24. A display 40, which is also shown connected to the control system 24, includes an in use indicator 42, a no service indicator 44, a roam A carrier indicator 46, and a roam B carrier indicator 48. Either the roam A carrier indicator 46 or the roam B carrier indicator 48 will be activated to indicate the A/B carrier type of the system being accessed in a roaming condition. Except for unique programming and the ability to perform the unique methods of the present invention, the cellular telephone 10 of the preferred embodiment of the present invention is very similar to a conventional digital cellular telephone. One example of an acceptable digital cellular telephone 10 which provides basic hardware without such programming and method abilities is the OKI CDMA CD-3000 or TDMA TD-3000, available from OKI Telecom, Inc. of Suwanee, GA.

Figure 2:
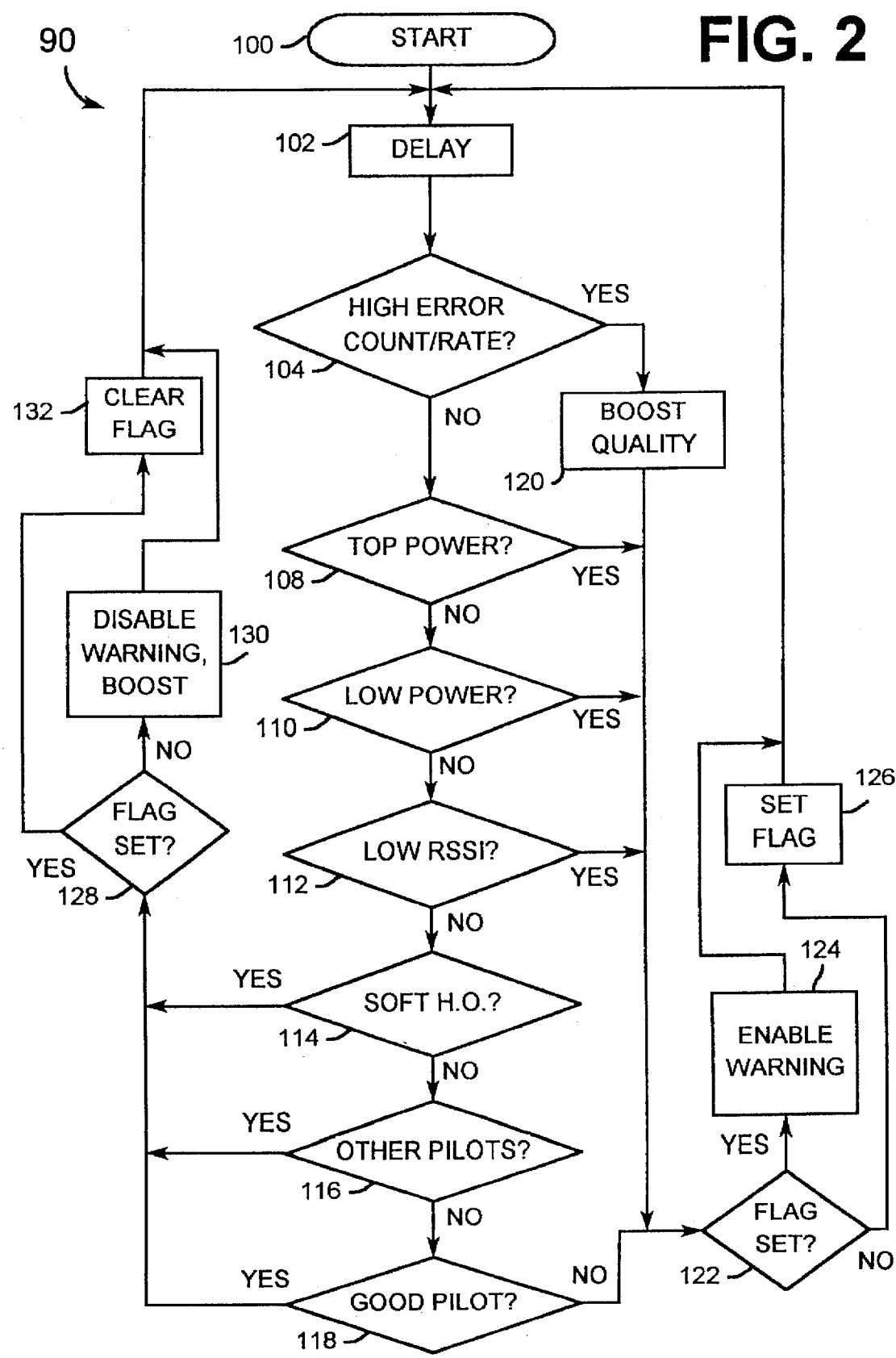
FIGS. 2-3 are flow chart representations of the steps of one warning method of the preferred embodiment of the present invention.

Refer now to FIG. 2 which shows a flow chart representation of the steps of a warning process 90 of the preferred embodiment of the present invention as directed by the control system 24 and memory 26 of the digital cellular telephone 10 of FIG. 1 (further references to the cellular telephone 10 and elements thereof should be understood to refer to FIG. 1). The warning process 90 monitors a plurality of communication conditions to detect and notify a user of the digital cellular telephone 10 when a communication disconnection is imminent. Thus, the warning process 90 begins after a communication connection is established and continues in a loop until the connection is broken. Furthermore, the warning process 90 can be enabled and disabled by a user through user-configurable settings accessed through the key pad 32 of the digital cellular telephone 10.

After beginning at start terminal 100, operation of the warning process 90 continues with block 102 where the warning process 90 delays for a predetermined amount of time, one acceptable example of which being one half of a second. Subsequently, the warning process 90 continues with decision block 104 to determine whether any of a plurality of counts or rates of continuous errors has exceeded a corresponding predefined threshold count or rate. If any count of continuous errors has exceeded such a predefined threshold count, or if any error rate has exceeded a predefined threshold rate, the warning process 90 continues with step 120 where the control system 24 of the digital cellular telephone 10 attempts to improve the quality of the received audio signal; otherwise, operation continues at decision block 108 where another condition indication is evaluated, as discussed in detail below.

Figure 3:
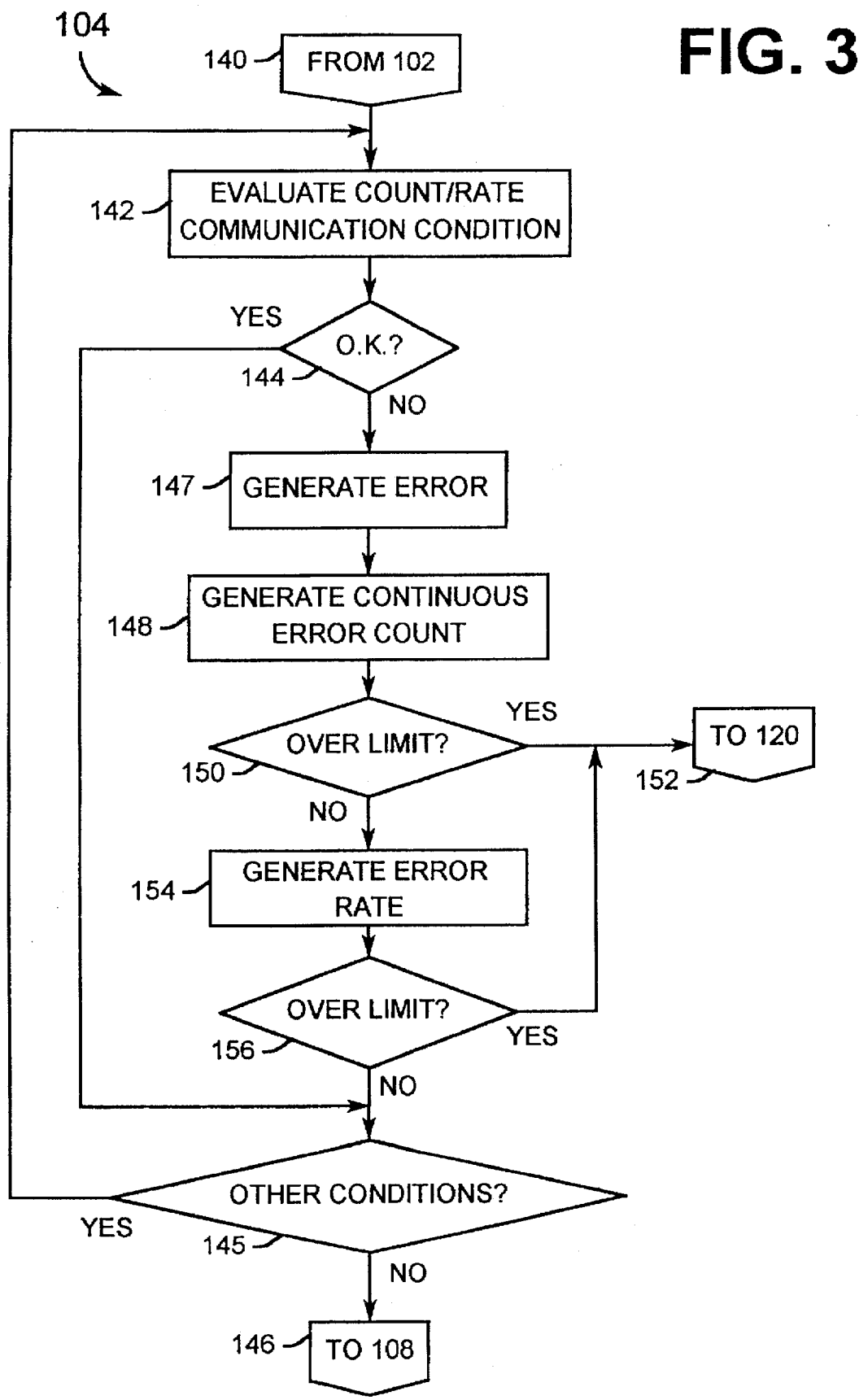

Refer now to FIG. 3 which shows a more detailed view of the steps of decision block 104. After connector 140, operation begins with step 142 which indicates that a count/rate communication condition is evaluated. According to the preferred embodiment of the present invention, the count/rate communication conditions include frame validity, frame quality, symbol quality, and chip quality. As long as a count/rate communication condition passes the evaluation of step 142, the YES branch of decision block 144 directs operation to decision block 145 where it is determined if other count/rate communication conditions have yet to be evaluated. If no other count/rate communication conditions remains to be evaluated, operation is directed back to FIG. 2 through connector 146 before being repeatedly directed back to FIG. 3 as the warning process continues to loop as shown in FIG. 2. On the other hand, if other count/rate communication conditions remain to be evaluated, operation is looped back up to step 142 where the next count/rate communication condition is evaluated.

If any count/rate communication condition does not pass the evaluation of step 142, the NO branch of decision block 144 directs operation to step 147 where a count/rate communication condition error is generated. Subsequently, step 148 indicates the generation (update) of a count indication of the number of continuous errors of the subject communication condition type (e.g., "How many errors of this type have there been in a row?"). Such a count of continuous errors indication is then analyzed at decision block 150 by comparing it to a predefined threshold count of continuous errors indication. If the updated count indication exceeds the predefined count indication, the YES branch of decision block 150 is taken to connector 152 where operation is directed back to FIG. 2 at step 120. Otherwise, the NO branch of decision block 150 directs operation to step 154 which shows the generation (update) of a rate indication of errors of the subject communication condition type (e.g., "How many errors of this type have occurred within the last 20 frames of data?"). According to decision block 156, this rate of errors indication is analyzed by comparing it to a predefined threshold rate of errors indication. If the updated rate of errors indication exceeds the predefined threshold rate of errors indication, the YES branch of decision block 156 directs operation to connector 152 where operation is directed back to FIG. 2 at step 120. Otherwise, the NO branch of decision block 156 directs operation to decision block 145 where, as discussed above, it is determined if other count/rate communication conditions have yet to be evaluated. Whereas the predefined threshold count of errors indication and the predefined threshold rate of errors indication for each particular type of count/rate communication condition is, according to the preferred embodiment of the present invention, fixed and initialized during installation, alternate embodiments of the present invention are contemplated wherein each such predefined indication is determined by an adaptive process which continually updates the predefined indications based upon continuing historical likelihoods of disconnection, the implementation of which would be understood by one reasonably skilled in the art after reading and understanding the present specification. As an example, historic data consisting of system identification, network identification, base station identification and other information is used to determine if a CDMA disconnection or handoff will take place.

Regarding specific operation of the process of FIG. 3, as mentioned previously, frame validity, frame quality, symbol quality, and chip quality are the count/rate communication conditions successively evaluated in step 142. Evaluation of the frame validity condition includes calculating a current frame cyclic redundancy code or checksum and comparing it to a cyclic redundancy code or checksum predefined and transmitted along with the frame data by a base station. If the calculated frame checksum is identical to the predefined frame checksum, operation proceeds along the YES branch of decision block 144. Otherwise, if the calculated frame checksum is different from the predefined frame checksum, operation proceeds along the NO branch of decision block 144 to step 147 where a frame checksum error is generated. Once the frame checksum error is generated, steps 148–156 indicate that a count of continuous frame checksum errors indication and a rate of frame checksum errors indication are generated and compared to predefined threshold indications so that operation continues with FIG. 2 at step 120 if either generated indication exceeds the corresponding predefined threshold indication, otherwise continuing with decision block 145 to check for count/rate communication conditions remaining to be evaluated. Without limitation, one example of an acceptable predefined threshold count of continuous frame checksum errors indication is 3, and one example of an acceptable predefined threshold rate of frame checksum errors indication is 2 in 20.

Evaluation of the frame quality condition includes determining whether the current frame of communication data is of insufficient quality. A frame with insufficient quality consists of a frame of data which, in addition to failing the checksum, failed a condition where the number of symbol errors exceeded a threshold for all data rates. If the current frame is of insufficient quality, a current insufficient quality frame error is generated in step 147, and, according to subsequent steps 148–156, a count of continuous insufficient quality frame errors indication and a rate of insufficient quality frame errors indication are generated and compared to predefined threshold indications. Without limitation, one example of an acceptable predefined threshold count of continuous insufficient quality frame errors indication is 2, and one example of an acceptable predefined threshold rate of insufficient quality frame errors indication is 1 in 20.

Similarly, evaluation of the symbol quality and chip quality conditions include determining whether current symbols and chips, respectively, are of sufficient quality. A symbol consists of a number of data bits that represent a single information bit, while a chip is a single data bit of a repetitive sequence of data bits that is used to modulate symbols. Evaluation of the chip quality includes determining if the chip has been degraded by intersymbol interference less that 1 chip distance, if the chip has been degraded by tracking errors, if the chip has been degraded by intermodulation distortion, if the chip has been degraded by other cell interference, of if the chip has been degraded by gaussian noise. Alternative forms of evaluation of the chip quality are also contemplated, and methods of detecting chip degradation mechanisms will be understood by one reasonably skilled in the art. Evaluation of the symbol quality includes determining if the symbol has been degraded by chip errors. There should not be a change of state within a symbol. Additionally, symbol errors are detected by the decoder based upon determining the most likely sequences. Alternative forms of evaluation of the symbol quality are contemplated, and methods of detecting symbol degradation mechanisms will be understood by one reasonably skilled in the art.

Accordingly, and in a manner to similar to that discussed above, a current insufficient quality symbol error and a current insufficient quality chip error are generated and used to generate a count of continuous insufficient quality symbol errors indication, a count of continuous insufficient quality chip errors indication, a rate of insufficient quality symbol errors indication, and a rate of insufficient quality chip errors indication, all of which are compared to predefined threshold indications. Again, without limitation, one example of an acceptable predefined threshold count of continuous insufficient quality symbol errors indication is 5, one example of an acceptable predefined threshold count of continuous insufficient quality chip errors indication is 100, one example of an acceptable predefined threshold rate of insufficient quality symbol errors indication is 5 in 20, and one example of an acceptable predefined threshold rate of insufficient quality chip errors indication is 200 in 1,000.

Referring back to FIG. 2, if no count of continuous errors indication or rate of errors indication exceeds (violates) a corresponding predefined condition threshold, operation continues at decision block 108 where a transmitter output power level indication is generated and analyzed to determine if it is too high. The transmitter output power level indication is generated by measuring the amount of power output by a transmitter portion of the transceiver 22 of the digital cellular telephone 10. Determining whether the transmitter output level indication is too high includes comparing it to a predefined high power threshold level. This high power threshold level is defined by the maximum output power allowed by regulation and diminished according to remaining battery charge. Thus, a determination that the transmitter output power level indication exceeds (violates) the predefined high power threshold level indicates a likelihood of movement into a location outside of a cell or to a location difficult to maintain with remaining battery power. Without limitation, one example of an acceptable predefined high transmitter output power threshold level is 0.6 watts at full battery charge.

If the transmitter output power level indication does not exceed the predefined high power threshold level, the NO branch of decision block 108 directs operation to decision block 110 where the same transmitter output power level indication is compared to a predefined low power threshold level to determine if the transmitter output power level indication is too low. There are circumstances when a base station may disable a digital cellular telephone, including when a digital cellular telephone moves into an area of low propagation loss in relationship to a base station and transmits excessive power so that the base station deems the telephone defective and interfering with other communication. Since such disabling can be preceded by a series of output power reductions, the preferred method of the present invention includes determining when the output power falls below a predetermined amount in an effort to anticipate such disabling. Thus, a determination that the transmitter output power level indication has fallen below, or violated, the predefined low power threshold level indicates, at least, a likelihood of imminent disabling by a base station due to movement into an area of very low propagation loss. Without limitation, one example of an acceptable predefined low transmitter output power threshold level is −50 dBm.

If the transmitter output power level has not fallen below the predefined low power threshold, the NO branch of decision block 110 directs operation to decision block 112 where a received signal strength indication (RSSI) is generated and compared to a predefined low received signal strength indication. The received signal strength indication is generated by measuring, as would be understood by one reasonably skilled in the art, the total strength of the communication signal received by a receiver portion of the transceiver 22 of the digital cellular telephone 10. The predefined low received signal strength indication is fixed such that the probability of imminent disconnection becomes high when the received signal strength indication falls below that fixed level. Without limitation, one example of an acceptable predefined low RSSI threshold indication is −105 dBm.

If the received signal strength indication has not fallen below the predefined low received signal strength indication, the NO branch of decision block 112 directs operation to decision block 114 where the control system 24 of the digital cellular telephone 10 determines whether the digital cellular telephone 10 is experiencing a soft handoff, in which case a soft handoff indication would be generated. As would be understood by one reasonably skilled in the art, a soft handoff occurs when a call is simultaneously shared between base stations. If the digital cellular telephone 10 is not experiencing a soft handoff, the NO branch of decision block 114 directs operation to decision block 116 where the control system 24 of the digital cellular telephone 10 determines whether pilot signals from other base stations are detectable, in which case an other pilot signal detection indication is generated. By checking for other pilot signals, the control system 24 of the digital cellular telephone 10 determines whether it is likely that a soft handoff is about to occur or has recently occurred. If no other pilot signals are detected above a threshold, the NO branch of decision block 116 directs operation to decision block 118 where a measure is made of the strength of the current pilot signal, referred to as a current pilot signal strength indication. Unlike the RSSI which is the strength of the total received signal, the current pilot signal strength indication is a code representation of the signal to noise ratio of a signal given code channel. If the current pilot signal strength is below a predefined current pilot signal strength threshold, the NO branch is taken to decision block 122, otherwise the YES branch is taken to decision block 128. Thus, because of the arrangement of decision blocks 114, 116, and 118, the NO branch of decision block 118 is taken if the current pilot signal strength is below (violates) a predefined threshold and the digital cellular telephone 10 is both not experiencing a soft handoff and is not detecting other pilot signals. Without limitation, one example of an acceptable predefined current pilot strength threshold is −15 dB Ec/No.

Besides through the NO branch of decision block 118, decision block 122 can be reached through the YES branches of decision blocks 104, 108, 110, and 112. Referring back to decision block 104, if any count of continuous errors indication or rate of errors indication exceeds a corresponding predefined condition threshold, operation continues through the YES branch of decision block 104 to step 120 where the control system 24 of the digital cellular telephone 10 attempts to improve the quality of the received audio signal. One example of an acceptable method of attempting to improve the quality of the received audio signal include enabling additional components of the digital cellular telephone 10, such as enabling additional demodulator fingers and improving the demodulator finger performance within the transceiver 22 to better correlate CDMA energy, or enabling echo cancellers within the transceiver 22 to reduce inter-symbol interference, or enabling narrow band interference cancelers within the transceiver 22 to reduce the effects of narrow band interference, or enabling other interference cancellers within the transceiver 22 to reduce the effects of other cell interference, or increasing the dynamic range within the transceiver 22 to reduce the effects of intermodulation distortion, or increasing the number of quantization bits used within the transceiver 22 to increase the dynamic range of the transceiver 22, or using soft-decision within the transceiver 22 to reduce symbol errors, or setting the decoder parameters to use the full length constraint length within the transceiver 22 to reduce symbol errors. Alternative forms of improving the signal quality are also contemplated, and methods of implementing signal quality mechanisms will be understood by one reasonably skilled in the art. Another example includes, within the control system 24, changing voice decoder parameters to, for example, reduce audio gain, mute audio or substitute frames of data for present erroneous frames. It should be understood that the present invention includes using each of these methods to adaptively improve quality, but certainly contemplates using any one or combination of these or other methods to accomplish the goal of improving the sound of received signals to the user.

According to the preferred embodiment of the present invention, the control system 24 utilizes a delayed redundant comparison before enabling any warnings. Step 102 represents the "delayed" portion of such a description, whereas the use of a flag memory element represents the "redundant" portion. Upon reaching decision block 122, the control system 24 checks to see if a flag memory element has been set. If the flag has been set previously, the YES branch directs operation to step 124 where a warning is enabled before the process continues at step 102 where the process is again delayed. Otherwise, the NO branch of decision block 122 is taken to step 126 where the flag memory element is set before operation is directed back to step 102. Regarding step 124 where a warning is enabled, one preferred example of a warning includes generating and emitting an audible sound recognizable by the user. One example of such a sound is an ordinary beep or tone emitted by the speaker 30 or another external speaker. Another example of such a sound is a gaussian noise added to the received digitized audio data which is similar to the noise received in an analog cellular telephone losing a signal. One method of providing such gaussian noise includes generating random data words with a random pattern generator within the control system 24 and summing the random data words with received digitized audio data words. Another example of a warning includes generating a visual indication through the display 40. Such a visual indication can easily be accomplished through lighting, darkening, or blinking one or more present or additional indicators on the display 40. Yet another example of a warning includes operating a vibration device 31 or other sensory device. It should also be understood that the present invention includes using one or more of the above notification methods and contemplates using other warning method for getting a user's attention.

According to FIG. 2, if communication is not suffering from any of the problems represented by decision blocks 104, 108, 110 or 112, and the digital cellular telephone 10 is experiencing a soft handoff, detecting other pilot signals, or detecting a strong pilot signal, a YES branch of one of the decision blocks 114, 116 or 118 directs operation to decision block 128 where the control system 24 checks to see if the flag memory element has been set by a previous step 126. If the flag was set previously, step 132, indicates that the flag is cleared before the process is delayed again at step 102. Otherwise, if the flag has not been set, the NO branch of decision block 128 directs operation to step 130 where the control system 24 disables any previously enabled warnings and methods for adaptively improving signal quality before directing operation back to step 102 for a delay. Thus, it can be seen that the warning process 90 waits for two consecutive threshold violations before enabling a notification warning and waits for two consecutive passes without a threshold violation before disabling the notification warning. In this way, the likelihood of an erroneous enabling of a warning and the likelihood of an erroneous disabling of a warning are reduced. Furthermore, it should be understood that the present invention contemplates additional stages of flag memory element operation to further decrease these likelihoods. In addition, other embodiments of the present invention include providing separate flag memory elements for each type of threshold violation so that consecutive violations of the same type of threshold are required to enable a warning.

Whereas the preferred embodiment of the present invention includes the analysis technique of reacting to any one of a large variety of threshold comparisons, omission of one or more of the comparisons is considered to be within the scope of the present invention. Thus, the scope of the present invention is understood to include all combinations of the threshold comparisons discussed above. Furthermore, other exemplary analysis techniques include evaluating whether historically adaptive combinations of condition indications violate predefined thresholds. Other techniques include evaluating combinations of condition indications weighted according to the degree of threshold violation.

According to an alternate embodiment of the present invention, a warning process is performed on a time division multiple access (TDMA) digital cellular telephone. A TDMA digital cellular telephone has similar count/rate communication conditions, with the exception of the chip count/rate condition. The TDMA digital cellular telephone has similar transmitter output power level indication and has similar low RSSI indication. The TDMA digital cellular telephone has no soft handoff indication or pilot signal; however, the other pilot indication would be replaced by a decision to determine if other cells are within the coverage area. The TDMA digital cellular telephone signal enhancements are similar except for the absence old modulator fingers. Evaluation of communication condition parameter quality :for TDMA is similar to the communication condition parameter quality described except for the chip quality.

According to other alternate embodiments of the present invention, similar communication conditions are monitored to accomplish alternate results. In one such alternate embodiment, communication conditions are monitored to notify a user of an imminent change in communication mode, such as an inter-system handoff, in which case the user is provided an opportunity to alter any movement to remain well within a cell or microcell. According to one example of such an embodiment, the imminent inter-system handoff warning is provided to the user before a base station recognizes a need to communicate handoff signaling to the cellular telephone or to another base station. In this way, the user is given adequate time to react to the warning, and unnecessary use of base station handoff initiation resources is avoided. According to another alternate embodiment of the present invention, communication conditions are monitored in a dual mode cellular telephone to notify a base station of the need to change communication modes (digital v. analog) and to notify the user of an imminent communication mode change.

While the embodiments of tile present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below.

We claim:

1. A method of notifying a user of a digital cellular telephone during digital cellular communication of an imminent digital communication disconnection, said method comprising the steps of:

generating a condition indication representative of a digital communication condition, including generating a transmitter output power level indication, and analyzing the condition indication to determine whether a digital communication disconnection is imminent, including determining whether the transmitter output power level indication is less than a predefined low power threshold level; and notifying the user that a digital communication disconnection is imminent responsive to determining a digital communication disconnection is imminent.

2. A method of notifying a user of a digital cellular telephone during digital cellular communication of an imminent digital communication disconnection, said method comprising the steps of:

generating a condition indication representative of a digital communication condition;

analyzing the condition indication to determine whether a digital communication disconnection is imminent;

notifying the user that a digital communication disconnection is imminent responsive to determining a digital communication disconnection is imminent; and continually repeating the generating and analyzing steps during a telephone call, wherein the generating a condition indication step includes, at least, the steps of evaluating current frame validity, including, at least, the steps of calculating a current frame checksum, and comparing the calculated frame checksum to a predefined frame checksum, generating a frame checksum error responsive to the calculated frame checksum differing from the predefined frame checksum, and generating a count of continuous frame checksum errors indication.

3. The method of claim 2, wherein the generating a condition indication step further includes, at least, the step of generating a rate of frame checksum errors indication.

4. A method of notifying a user of a digital cellular telephone during digital cellular communication of an imminent digital communication disconnection, said method comprising the steps of:

generating a condition indication representative of a digital communication condition;

analyzing the condition indication to determine whether a digital communication disconnection is imminent;

notifying the user that a digital communication disconnection is imminent responsive to determining a digital communication disconnection is imminent;

continually repeating the generating and analyzing steps during a telephone call, wherein the generating a condition indication step includes, at least, the steps of evaluating current frame quality to determine whether the current frame is of insufficient quality, generating a current insufficient quality frame error responsive to determining the current frame is of insufficient quality, and generating a count of continuous insufficient quality frame errors indication.

5. The method of claim 4, wherein the generating a condition indication step further includes, at least, the step of generating a rate of insufficient quality frame errors indication.

6. A method of notifying a user of a digital cellular telephone during digital cellular communication of an imminent digital communication disconnection, said method comprising the steps of:

generating a condition indication representative of a digital communication condition;

analyzing the condition indication to determine whether a digital communication disconnection is imminent;

notifying the user that a digital communication disconnection is imminent responsive to determining a digital communication disconnection is imminent;

continually repeating the generating and analyzing steps during a telephone call, wherein the generating a condition indication step includes, at least, the steps of evaluating current symbol quality to determine whether the current symbol is of insufficient quality, generating a current insufficient quality symbol error responsive to determining the current symbol is of insufficient quality, and generating a count of continuous insufficient quality symbol errors indication.

7. The method of claim 6, wherein the generating a condition indication step further includes, at least, the step of generating a rate of insufficient quality symbol errors indication.

8. A method of notifying a user of a digital cellular telephone during digital cellular communication of an imminent digital communication disconnection, said method comprising the steps of:

generating a condition indication representative of a digital communication condition;

analyzing the condition indication to determine whether a digital communication disconnection is imminent;

notifying the user that a digital communication disconnection is imminent responsive to determining a digital communication disconnection is imminent;

continually repeating the generating and analyzing steps during a telephone call, wherein the generating a condition indication step includes, at least, the steps of evaluating current chip quality to determine whether the current chip is of insufficient quality, generating a current insufficient quality chip error responsive to determining the current chip is of insufficient quality, and generating a count of continuous insufficient quality chip errors indication.

9. The method of claim 8, wherein the generating a condition indication step further includes, at least, the step of generating a rate of insufficient quality chip errors indication.

10. A method of notifying a user of a digital cellular telephone during digital cellular communication of an imminent digital communication disconnection, said method comprising the steps of:

generating a condition indication representative of a digital communication condition, including generating a transmitter output power level indication;

analyzing the condition indication to determine whether a digital communication disconnection is imminent, including determining whether the transmitter output power level indication is greater than a predefined high power threshold level; and notifying the user that a digital communication disconnection is imminent responsive to determining a digital communication disconnection is imminent.

11. A method of notifying a user of a digital cellular telephone during digital cellular communication of an imminent digital communication disconnection, said method comprising the steps of:

generating a condition indication representative of a digital communication condition;

analyzing the condition indication to determine whether a digital communication disconnection is imminent;

notifying the user that a digital communication disconnection is imminent responsive to determining a digital communication disconnection is imminent; and enhancing received communication signal quality responsive to determining a digital communication disconnection is imminent.

12. The method of claim 11, wherein the enhancing step includes allocating power to additional digital cellular telephone receiver components.

13. The method of claim 11, wherein the generating a condition indication step includes generating a condition indication representative of a digital communication condition in a code division multiple access digital cellular telephone, and wherein the enhancing step includes operating additional demodulator fingers to enhance received communication quality.

14. The method of claim 11, wherein the generating a condition indication step includes generating a condition indication representative of a digital communication condition in a code division multiple access digital cellular telephone, and wherein the enhancing step includes operating additional echo cancelers to cancel additional intersymbol interference.

15. The method of claim 11, wherein the generating a condition indication step includes generating a condition indication representative of a digital communication condition in a code division multiple access digital cellular telephone, and wherein the enhancing step includes substituting previous frames for current frames.

16. A cellular telephone apparatus comprising:
a user interface; and
a control system, coupled to said user interface, including
means for controlling said user interface,
means for storing programming information for directing operation of said apparatus,
means for generating, at said apparatus, a first condition indication representative of a first received signal communication condition,
means for generating, at said apparatus, a second condition indication representative of a second received signal communication condition, wherein the first communication condition and the second communication condition are distinct and different types of received signal communication conditions,
means for analyzing both the first condition indication and the second condition indication to determine, at said apparatus, whether a communication mode change is imminent, and
means for notifying a user of said apparatus that the communication mode change is imminent responsive to determining the communication mode change is imminent.

17. The apparatus of claim 16, wherein said user interface includes
a transceiver coupled to said control system,
an antenna coupled to said transceiver,
a microphone coupled to said control system,
a speaker coupled to said control system,
a keypad coupled to said control system, and
a visual display coupled to said control system.

18. The apparatus of claim 17, wherein said control system further includes means for disabling said noticing means through user-configurable settings accessed through said keypad.

19. The apparatus of claim 16, wherein the communication mode change includes changing from a digital operation mode to an analog operation mode.

20. The apparatus of claim 16, wherein the communication mode change includes changing from an analog operation mode to a digital operation mode.

21. The apparatus of claim 16, wherein the communication mode change includes an intersystem handoff.

22. The apparatus of claim 16, wherein the communication mode change includes an imminent disconnection.

23. The apparatus of claim 16, wherein said analyzing means includes means for evaluating the first condition indication and the second condition indication as weighted factors in determining whether the communication mode change is imminent.

24. The apparatus of claim 16, wherein said analyzing means includes
means for comparing the first condition indication to a predefined first condition threshold,
means for comparing the second condition indication to a predefined second condition threshold, and
means for determining that the communication mode change is imminent if either predefined condition threshold is violated.

25. The apparatus of claim 16, wherein said control system further includes means for adaptively enhancing received communication signal quality, with no required action on an operating member, responsive to determining the communication mode change is imminent.

26. In a communication system in which a user of a cellular telephone is notified of an imminent communication mode change, said system comprising
means for generating a first condition indication, at said cellular telephone, representative of a first communication condition during a first period;
means for comparing, at said cellular telephone, the first condition indication to a first predefined condition threshold;
means for initiating a delayed redundant comparison responsive to results of said first condition comparing means; means for generating a second condition indication, at said cellular telephone, representative of a second communication condition during a second period;
means for comparing, at said cellular telephone, the second condition indication to a second predefined condition threshold;
means for analyzing, at said cellular telephone, results of said initiating means and results of said second condition comparing means to determine whether a communication mode change is imminent; and
means for notifying said user that the communication mode change is imminent responsive to determining that the communication mode change is imminent.

27. The system of claim 26, wherein said initiating means includes means for setting a flag memory element responsive to said first condition comparing means.

28. The system of claim 26, further comprising means for re-initiating the delayed redundant comparison responsive to said analyzing means determining the communication mode change is not imminent.

29. The system of claim 26,
wherein the communication mode change defines an inter-system handoff,
wherein the first communication condition defines a cellular handoff status,
wherein the second communication condition defines a current pilot signal strength, and
wherein said analyzing means includes determining the inter-system handoff is imminent when both the current pilot signal strength is below a predefined current pilot signal strength threshold and said cellular telephone is experiencing a soft handoff.

30. The system of claim 26, wherein the first communication condition is identical to the second communication condition.

31. The system of claim 26,
wherein the first predefined condition threshold defines a high power threshold level,
wherein the first condition indication defines a transmitter output power level indication which indicates an amount of power output by a transceiver of said cellular telephone,
wherein the transmitter output power level indication is greater than the high power threshold level, and
wherein said first condition comparing means includes means for reducing the amount of power output by said transceiver.

32. The system of claim 26, wherein said analyzing means further includes means for delaying for a predefined amount of time before determining the communication mode change is imminent.

33. The system of claim 26, wherein said notifying means includes means for generating an audible sound.

34. The system of claim 26, wherein said notifying means includes means for generating a visual warning indication.

35. The system of claim 26, wherein said notifying means includes means for activating a vibration device.

36. The system of claim 26, further comprising means for changing the communication mode responsive to determining the communication mode change is imminent.

37. A digital cellular telephone apparatus for communicating in a digital communication mode, said apparatus comprising:
means for generating a condition indication representative of a digital communication condition;
means for analyzing the condition indication to determine whether a digital communication disconnection is imminent;
means for notifying a user of said digital cellular telephone that the digital communication disconnection is imminent responsive to determining the digital communication disconnection is imminent; and
means for adaptively enhancing received communication signal quality responsive to determining the digital communication disconnection is imminent.

38. The apparatus of claim 37, wherein said adaptively enhancing means includes means for setting decoder parameters to use a full length constraint length to reduce symbol errors.

* * * * *